United States Patent
Kawamura et al.

(10) Patent No.: US 8,630,226 B2
(45) Date of Patent: Jan. 14, 2014

(54) MOBILE STATION, BASE STATION, COMMUNICATION SYSTEM, AND COMMUNICATION METHOD

(75) Inventors: Teruo Kawamura, Yokosuka (JP);
Yoshihisa Kishiyama, Yokosuka (JP);
Kenichi Higuchi, Yokohama (JP);
Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1005 days.

(21) Appl. No.: 12/161,204

(22) PCT Filed: Jan. 10, 2007

(86) PCT No.: PCT/JP2007/050150
§ 371 (c)(1),
(2), (4) Date: Sep. 24, 2008

(87) PCT Pub. No.: WO2007/083544
PCT Pub. Date: Jul. 26, 2007

(65) Prior Publication Data
US 2010/0111044 A1 May 6, 2010

(30) Foreign Application Priority Data
Jan. 17, 2006 (JP) .................................. 2006-009302

(51) Int. Cl.
*H04W 4/00* (2009.01)
*H04B 7/216* (2006.01)
*H04K 1/10* (2006.01)
*H04L 27/28* (2006.01)

(52) U.S. Cl.
USPC ............................ 370/328; 370/342; 375/260

(58) Field of Classification Search
None
See application file for complete search history.

(56) References Cited

U.S. PATENT DOCUMENTS

| | | | | |
|---|---|---|---|---|
| 2002/0172293 A1* | 11/2002 | Kuchi et al. | ............ | 375/267 |
| 2003/0152022 A1* | 8/2003 | Hosur | ............ | 370/208 |
| 2003/0152023 A1* | 8/2003 | Hosur et al. | ............ | 370/208 |

(Continued)

FOREIGN PATENT DOCUMENTS

| | | |
|---|---|---|
| DE | 10341546 A1 | 1/2005 |
| JP | 10-233713 A | 9/1998 |
| WO | 0241509 A2 | 5/2002 |
| WO | 02080375 A2 | 10/2002 |

OTHER PUBLICATIONS

Tarik Muharemovic, "Multi-User Pilot Sequence Allocation in OFDM systems", Aug. 2005, entire document.*
3GPP TR 25.814 VO.4.2., 3GPP, Nov. 2005, pp. 1, 41-44.

(Continued)

*Primary Examiner* — Suk Jin Kang
(74) *Attorney, Agent, or Firm* — Osha Liang LLP

(57) ABSTRACT

A disclosed communication system includes multiple mobile stations and a base station. The mobile station maps a pilot channel comprising a CAZAC code to a signal including multiple frequency components arranged at regular intervals in a given frequency band, and transmits a transmission signal including the signal according to scheduling information. The mobile station performs the mapping such that its transmission signal and transmission signals of other mobile stations using different frequency bands become orthogonal to each other on a frequency axis. The base station calculates the correlation between a received signal and a pilot channel replica, performs channel estimation, and demodulates the received signal based on the result of channel estimation. The base station generates the pilot channel replica by mapping a pilot channel comprising a CAZAC code to a signal including multiple frequency components arranged at regular intervals in a given frequency band.

42 Claims, 8 Drawing Sheets

(56) References Cited

U.S. PATENT DOCUMENTS

| | | |
|---|---|---|
| 2004/0066802 A1* | 4/2004 | Ro et al. .................. 370/528 |
| 2004/0165650 A1 | 8/2004 | Miyazaki et al. |
| 2005/0226140 A1 | 10/2005 | Zhuang et al. |
| 2006/0239181 A1* | 10/2006 | Hosur ....................... 370/208 |
| 2006/0291431 A1* | 12/2006 | Pajukoski et al. ......... 370/335 |
| 2007/0004465 A1* | 1/2007 | Papasakellariou et al. ... 455/571 |
| 2007/0183386 A1* | 8/2007 | Muharemovic et al. ...... 370/344 |

OTHER PUBLICATIONS

NTT DoCoMo et al., Orthogonal Pilot Channel in the Same Node B in Evolved UTRA Uplink, TSG-RAN WG1 # 42bis R1-051142, 3GPP, Oct. 2005.

Japanese Office Action for Application No. 2006-009302, mailed on Dec. 15, 2009 (5 pages).

Austrian Search Report and Written Opinion issued in Singapore Patent Application No. 200805510-5 (7 pages).

esp@cenet Patent Abstract for German Publication No. 10341546, publication date Jan. 5, 2005. (1 page).

Russian Office Action for Application No. 2008132421/09, mailed on May 20, 2010 (10 pages).

David C. Chu, "Polyphase Codes with Good Periodic Correlation Properties", IEEE Trans. Inform. Theory, vol. IT-18, pp. 531-532, Jul. 1972.

3GPP TSG RAN WG1 Ad Hoc on LTE, R1-050822, London, UK, Aug. 29-Sep. 2, 2005 Texas Instruments, "On Allocation of Uplink Pilot Sub-Channels in EUTRA SC-FDMA" (7 pages).

E. Hong, et al., "Synchronous Transmission Technique for the Reverse Link in DS-CDMA Terrestrial Mobile Systems," IEEE Trans. on Comm. vol. 47, No. 11, Nov. 1999, pp. 1632-1635 (4 pages).

E. Carni, et al., "Synchronous CDMA Based on the Cyclical Translations of a CAZAC Sequence," Proceedings of the IEEE 2nd Int'l. Symposium on Wireless Communication Systems, Sep. 5, 2005, pp. 442-446, (5 pages).

K.L. Baum, et al., "Cyclic-Prefix CDMA: An Improved Transmission Method for Broadband DS-CDMA Cellular Systems," Proceedings of the IEEE Wireless Communications and Networking Conference, Mar. 17, 2002, vol. 1, pp. 183-188 (6 pages).

International Search Report issued in PCT/JP2007/050150, mailed on Mar. 6, 2007 (4 pages).

Written Opinion issued in PCT/JP2007/050150, mailed on Mar. 6, 2007 (no translation) (4 pages).

Extended European Search Report for Application No. 07706497.0, mailed on Dec. 28, 2011 (8 pages).

Xianyang (Jeff) Zhuang et al., "GCL-based Preamble Design for 1024, 512 and 128 FFT Sizes in the OFDMA PHY Layer", IEEE 802.16 Broadband Wireless Access Working Group, Aug. 29, 2004.

* cited by examiner

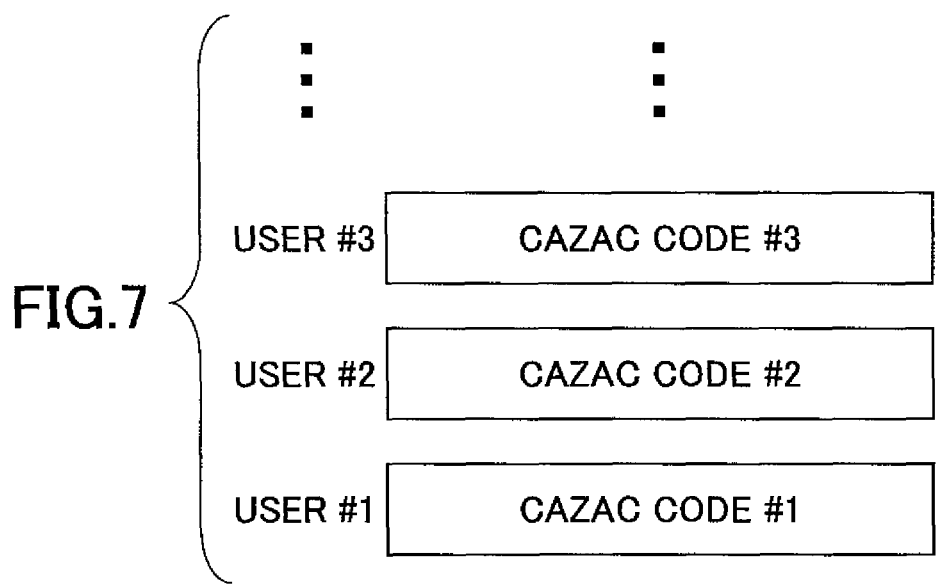

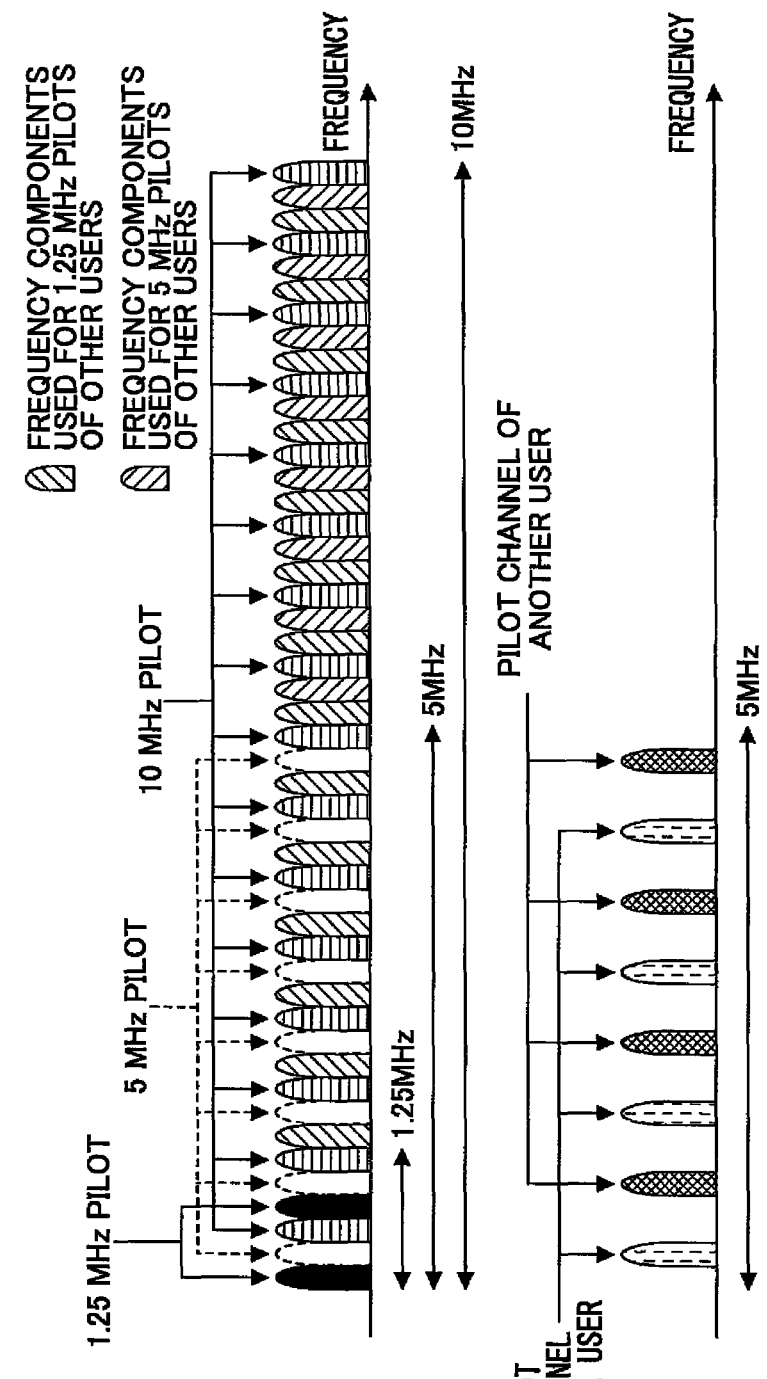

MOBILE STATION, BASE STATION, COMMUNICATION SYSTEM, AND COMMUNICATION METHOD

TECHNICAL FIELD

The present invention generally relates to wireless communication technologies. More particularly, the present invention relates to a mobile station, a base station, a communication system, and a communication method.

BACKGROUND ART

In the field of wireless communication, broadband wireless access technologies are becoming more and more important to meet the demand for high-speed, high-volume data communications. In the current third-generation wireless access system, direct-sequence code division multiple access (DS-CDMA) is employed to improve frequency efficiency and transmission efficiency by means of one-cell frequency reuse. A base station used in such a system has to communicate with mobile stations present in multiple sectors and therefore it is necessary to overcome the problem of multiple access interference (MAI). A conventional method to overcome multiple access interference in uplink communications is disclosed, for example, in non-patent document 1.

[Non-patent document 1] E. Hong, S. Hwang, K. Kim, and K. Whang, "Synchronous transmission technique for the reverse link in DS-CDMA", IEEE Trans. on Commun., vol. 47, no. 11, pp. 1632-1635, November 1999

DISCLOSURE OF INVENTION

Problems to be Solved by the Invention

The method disclosed in non-patent document 1 tries to overcome MAI by orthogonalizing uplink channels from mobile stations using orthogonal codes. However, to orthogonalize uplink channels from various mobile stations at a base station, all the uplink channels must be accurately synchronized at chip level. Also, the orthogonal relationship is established only between signals in synchronized paths. Evidently, such precise scheduling of signals requires a heavy workload for timing control and complicates processing.

Meanwhile, various frequency bands, broad and narrow, may be employed in future generation wireless access systems, and mobile stations may be required to support such various frequency bands depending on the purpose. Precisely synchronizing all mobile stations at chip level in such future systems will be all the more difficult.

Embodiments of the present invention make it possible to solve or reduce one or more problems caused by the limitations and disadvantages of the background art. One objective of the present invention is to provide a mobile station, a base station, a communication system, and a communication method that make it possible to reduce multiple access interference between mobile stations using the same frequency band as well as between mobile stations using different frequency bands.

Means for Solving the Problem

According to an embodiment of the present invention, a communication system includes multiple mobile stations and a base station. At least one of the mobile stations includes a pilot signal generating unit configured to generate a pilot channel comprising a CAZAC code, a first mapping unit configured to map the pilot channel to a signal including multiple frequency components arranged at regular intervals in a given frequency band, and a transmitting unit configured to transmit a transmission signal including an output signal from the first mapping unit according to scheduling information. The first mapping unit is configured to map the pilot channel to the frequency components such that the transmission signal of the own mobile station and transmission signals of the other mobile stations using frequency bands different from the frequency band of the own mobile station become orthogonal to each other on a frequency axis.

The base station includes a replica generating unit configured to generate a pilot channel replica, a correlation unit configured to calculate the correlation between a received signal and the pilot channel replica, a channel estimation unit configured to perform channel estimation based on an output from the correlation unit, and a demodulation unit configured to demodulate the received signal based on the result of channel estimation. The replica generating unit includes a pilot channel generating unit configured to generate a pilot channel comprising a CAZAC code, and a first mapping unit configured to map the pilot channel to a signal including multiple frequency components arranged at regular intervals in a given frequency band.

Advantageous Effect of the Invention

Embodiments of the present invention make it possible to reduce multiple access interference between mobile stations using the same frequency band as well as between mobile stations using different frequency bands.

BRIEF DESCRIPTION OF THE DRAWINGS

FIG. 7 is a drawing used to describe a method of assigning CAZAC codes to mobile stations using the same frequency band; and FIG. 8 is a drawing illustrating exemplary mapping of pilot channels by distributed FDMA.

EXPLANATION OF REFERENCES

Figure 1:
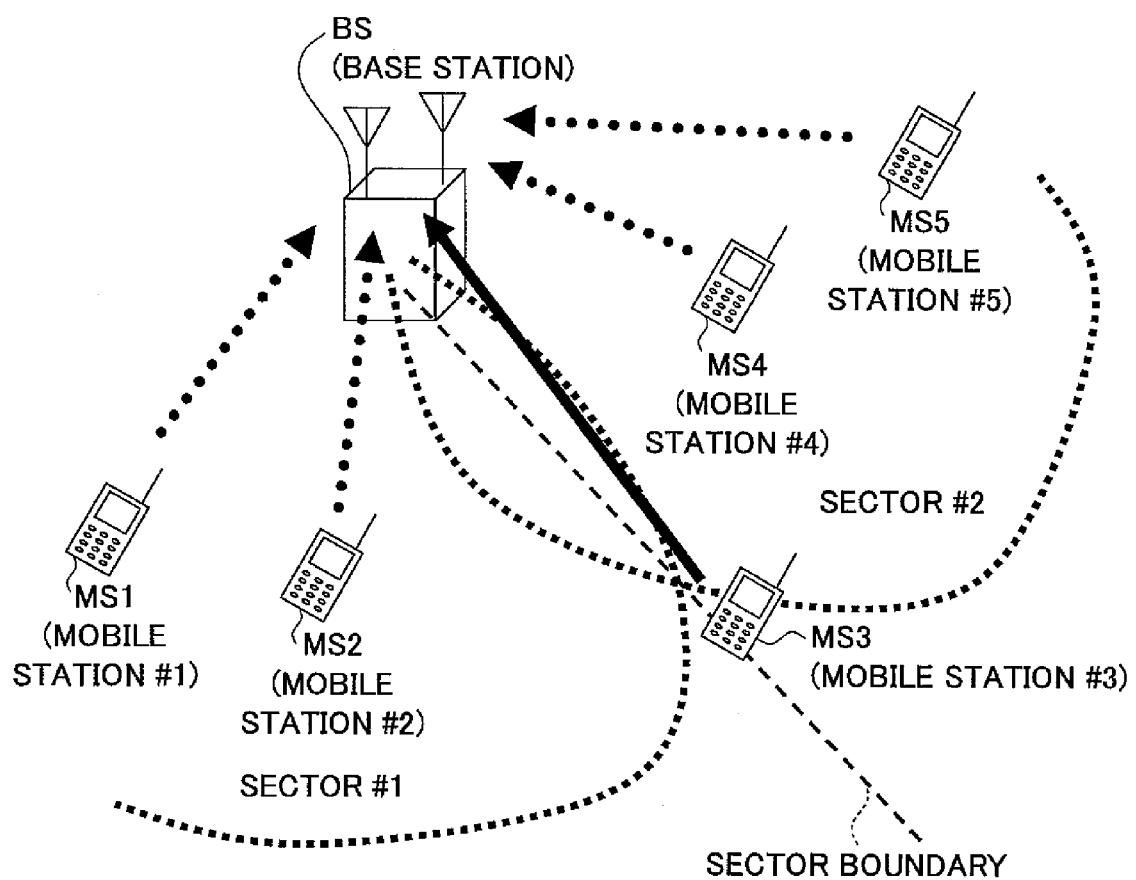
FIG. 1 is an overall view of a communication system according to an embodiment of the present invention.

MS Mobile station
BS Base station
21 Pilot channel generating unit
22 Shifting unit
23 Mapping unit
24 Data channel generating unit
25 Code spreading unit
26 Mapping unit
27 Multiplexing unit
28 Transmission timing adjusting unit
60 Separating unit
61 Demodulation unit 62 Path searcher
63 Correlation detecting unit
64 Timing detecting unit
65 Channel estimation unit
66 Pilot replica generating unit
67 Pilot channel generating unit
68 Shifting unit
69 Mapping unit

BEST MODE FOR CARRYING OUT THE
INVENTION

According to an embodiment of the present invention, uplink channels (pilot channels) of mobile stations using different frequency bands are distinguished by using distributed FDMA. Meanwhile, uplink pilot channels of mobile stations using the same frequency band are distinguished using a group of CAZAC codes that are orthogonal to each other and are generated by cyclically shifting a CAZAC code. This approach makes it possible to achieve orthogonality between mobile stations and also to maintain the orthogonality between delay paths of a pilot channel from each mobile station. This in turn makes it possible to reduce intersymbol interference observed at the base station to a very low level.

According to another embodiment of the present invention, although CAZAC codes are used for pilot channels of mobile stations using the same frequency band, the CAZAC codes are not generated by cyclically shifting a CAZAC code, but are generated independently for the respective mobile stations. Compared with a case where codes other than CAZAC codes are used, this approach makes it possible to dramatically reduce the interference (multipath interference) between delay paths and therefore makes it possible to reduce the total intersymbol interference observed at the base station at least by the reduction of the multipath interference. Also, this approach can be easily applied to a conventional system because there is no need to control the shift amount of CAZAC codes.

<First Embodiment>

FIG. 1 is an overall view of a mobile communication system employing CDMA according to an embodiment of the present invention. The communication system includes one or more mobile stations MS1 through MS5 and a base station BS. Each mobile station basically belongs to one sector. As an exception, however, a mobile station located at a sector boundary may belong to multiple sectors as in the case of the mobile station MS3. Each mobile station is able to use one or more of multiple frequency bands. In this embodiment, it is assumed that the following frequency bands are available: 20 MHz band, 10 MHz band that is a part of the 20 MHz band, 5 MHz band that is a part of the 10 MHz band, 2.5 MHz band that is a part of the 5 MHz band, and 1.25 MHz band that is a part of the 2.5 MHz band. The number of frequency bands and the bandwidths of frequency bands are not limited to those mentioned above. In this embodiment, various uplink channels (indicated by arrow lines from mobile stations to the base station in FIG. 1) received at the base station are synchronized to some extent. Although the synchronization is not at chip level, according to the present invention, uplink channels of the same type received within a certain period become orthogonal to each other.

Figure 2:
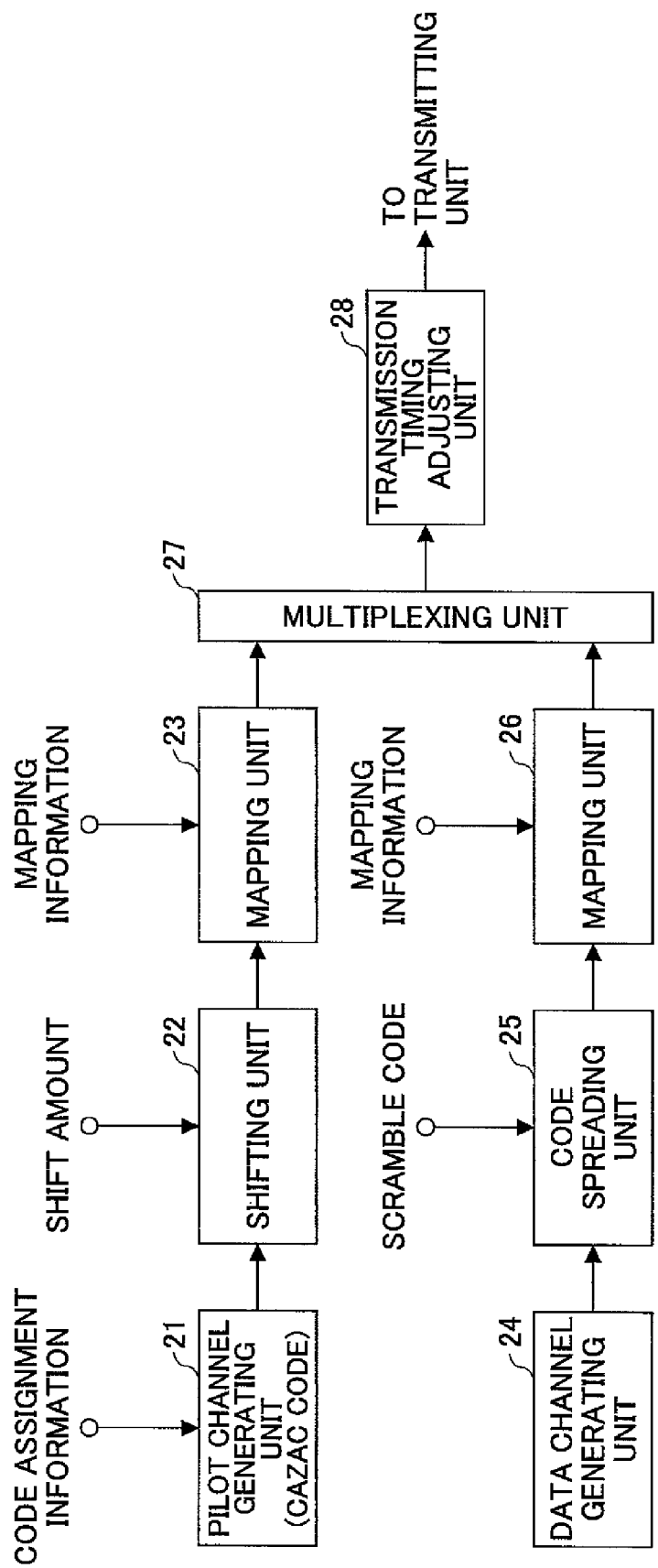
FIG. 2 is a partial block diagram illustrating a mobile station.

FIG. 2 is a partial block diagram illustrating a mobile station. The mobile station shown in FIG. 2 includes a pilot channel generating unit 21, a shifting unit 22, a first mapping unit 23, a data channel generating unit 24, a code spreading unit 25, a second mapping unit 26, a multiplexing unit 27, and a transmission timing adjusting unit 28.

The pilot channel generating unit 21 generates a pilot channel comprising a CAZAC code based on code assignment information. The CAZAC code is described below.

Figure 3:
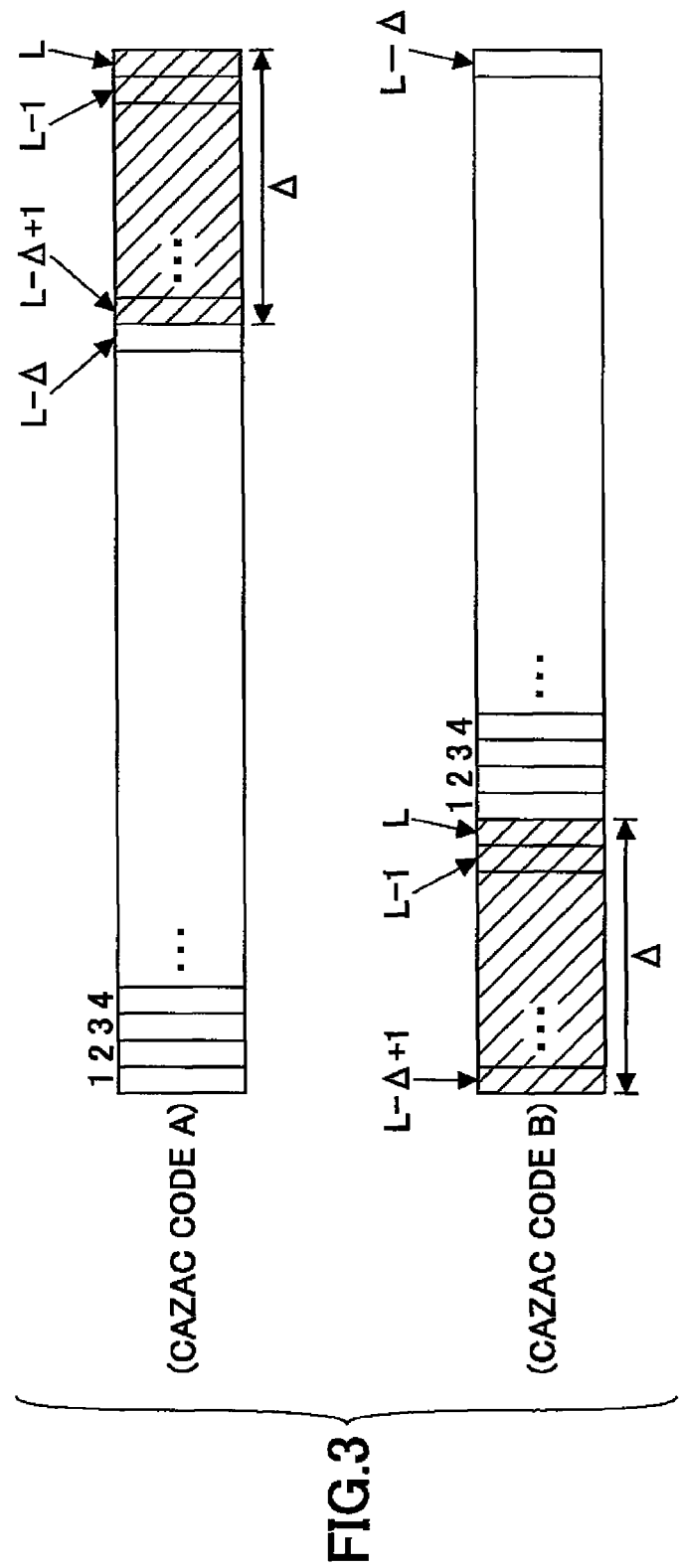
FIG. 3 is a drawing used to describe characteristics of a CAZAC code.

In FIG. 3, the code length of a CAZAC code A is L. For descriptive purposes, it is assumed that the code length corresponds to the duration of L samples. However, this assumption is not essential to the present invention. A CAZAC code B shown in the lower part of FIG. 3 is generated by moving $\Delta$ samples (indicated by hatching) including the sample (the L-th sample) at the end of the CAZAC code A to the head of the CAZAC code A. In this case, with regard to $\Delta=1$ through (L-1), the CAZAC codes A and B are orthogonal to each other. That is, a base CAZAC code and a CAZAC code generated by cyclically shifting the base CAZAC code are orthogonal to each other. Therefore, theoretically, when one CAZAC code with a code length L is given, it is possible to generate a group of L CAZAC codes that are orthogonal to each other.

In this embodiment, CAZAC codes selected from a group of CAZAC codes having the above described characteristic are used as pilot channels of mobile stations. More specifically, in this embodiment, among L orthogonal codes, $L/L_A$ CAZAC codes obtained by cyclically shifting a base CAZAC code by $n \times L_A$ ($n=1, 2, \ldots, L/L_A$) are actually used as pilot signals of mobile stations. As a result, uplink channels from mobile stations become orthogonal to each other. Details of the CAZAC code are described, for example, in the following documents: D. C. Chu, "Polyphase codes with good periodic correlation properties", IEEE Trans. Inform. Theory, vol. IT-18, pp. 531-532, July 1972; 3GPP, R1-050822, Texas Instruments, "On allocation of uplink sub-channels in EUTRA SC-FDMA".

The shifting unit 22 shown in FIG. 2 cyclically shifts a pilot channel (CAZAC code) generated by the pilot channel generating unit 21 and outputs the shifted pilot channel. The shift amount ($n \times L_A$) is set for each mobile station.

The first mapping unit 23 maps the pilot channel comprising the CAZAC code to a signal including multiple frequency components arranged at regular intervals in a frequency band currently being used by the mobile station. Specifically, the first mapping unit maps the pilot channel to multiple frequency components such that a transmission signal of its own mobile station and transmission signals of other mobile stations using frequency bands different from that of the own mobile station become orthogonal to each other on the frequency axis. This mapping method may be called distributed FDMA.

Figure 4:
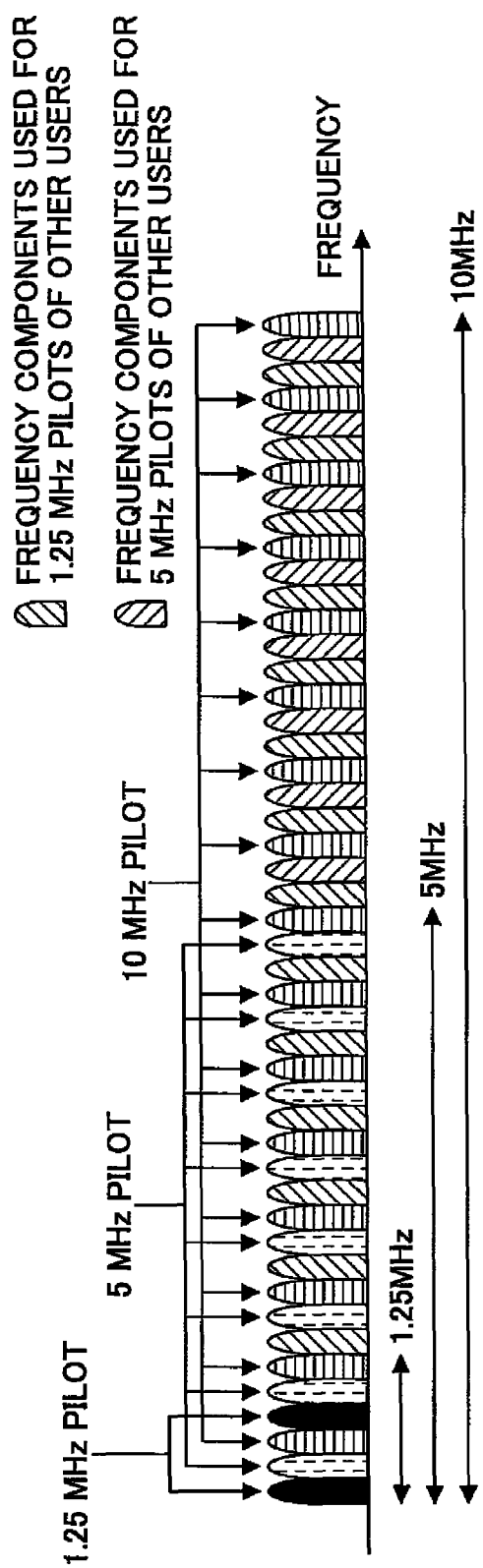
FIG. 4 is a drawing illustrating exemplary mapping of pilot channels by distributed FDMA.

FIG. 4 is a drawing illustrating exemplary mapping of uplink pilot channels. As described above, in this embodiment, mobile stations can use various frequency bands. A pilot channel of a mobile station using the 1.25 MHz band is mapped to two frequency components on the left. A pilot channel of a mobile station using the 5 MHz band is mapped to eight frequency components arranged at regular intervals on the left. A pilot channel of a mobile station using the 10 MHz band is mapped to 16 frequency components arranged at regular intervals. As shown in FIG. 4, pilot channels of the mobile stations using different frequency bands are mapped so as to become orthogonal to each other on the frequency axis. Mapping information indicating how to map pilot channels may be sent from the base station together with uplink scheduling information.

Various techniques may be used to map pilot channels as shown in FIG. 4. One of the techniques employs a single-carrier method. This technique achieves mapping in the frequency domain as shown in FIG. 4 by using fast Fourier transform (FFT) and inverse Fast Fourier transform (IFFT).

There is another technique that also employs a single-carrier method and uses variable spreading and chip repetition factors-CDMA (VSCRF-CDMA).

In this technique, a pilot channel is time-compressed and repeated, and further, a phase rotation set for each mobile station is applied to the pilot channel to convert it into a signal having a comb-like frequency spectrum as shown in FIG. 4. Still another technique employs a multicarrier method. This technique directly achieves mapping as shown in FIG. 4 by separately specifying subcarriers used for multicarrier transmission. In terms of reducing the peak-to-average power ratio of uplink, techniques using single-carrier methods are preferably used.

The data channel generating unit 24 shown in FIG. 2 generates a data channel. Although data channels are normally categorized into control data channels and user traffic data channels, they are not distinguished here for brevity.

The code spreading unit 25 multiplies a data channel by a scramble code and thereby performs code spreading.

The second mapping unit 26, similarly to the first mapping unit 23, maps the data channel to be transmitted to a signal including multiple frequency components arranged at regular intervals in a frequency band currently being used by the mobile station. This mapping may also be performed such that a transmission signal of the own mobile station and transmission signals of other mobile stations using frequency bands different from the frequency band of the own mobile station become orthogonal to each other on the frequency axis.

The multiplexing unit 27 multiplexes the mapped pilot channel and data channel to generate a transmission signal. The multiplexing may be performed using one or both of time-division multiplexing and frequency-division multiplexing. However, code division multiplexing (CDM) is not used here. This is because superior autocorrelation characteristics (orthogonality between delay paths of a pilot channel from each mobile station and orthogonality between codes obtained by cyclic shift) of the CAZAC code is lost if the CAZAC code is multiplied by still another code. Multiplexing the pilot channel and the data channel by the multiplexing unit 27 is not essential to the present invention. For example, the pilot channel may be sent separately to the base station during a given period.

The transmission timing adjusting unit 28 adjusts the timing of transmitting the transmission signal according to scheduling information from the base station so that signals received by the base station from multiple mobile stations are synchronized with each other.

In this embodiment, uplink channels (pilot channels) of mobile stations using different frequency bands are distinguished by using distributed FDMA as shown in FIG. 4. In the example shown in FIG. 4, all pilot channels of the mobile stations using the 1.25 MHz, 5 MHz, and 10 MHz bands are orthogonalized on the frequency axis by using distributed FDMA.

Figure 5:
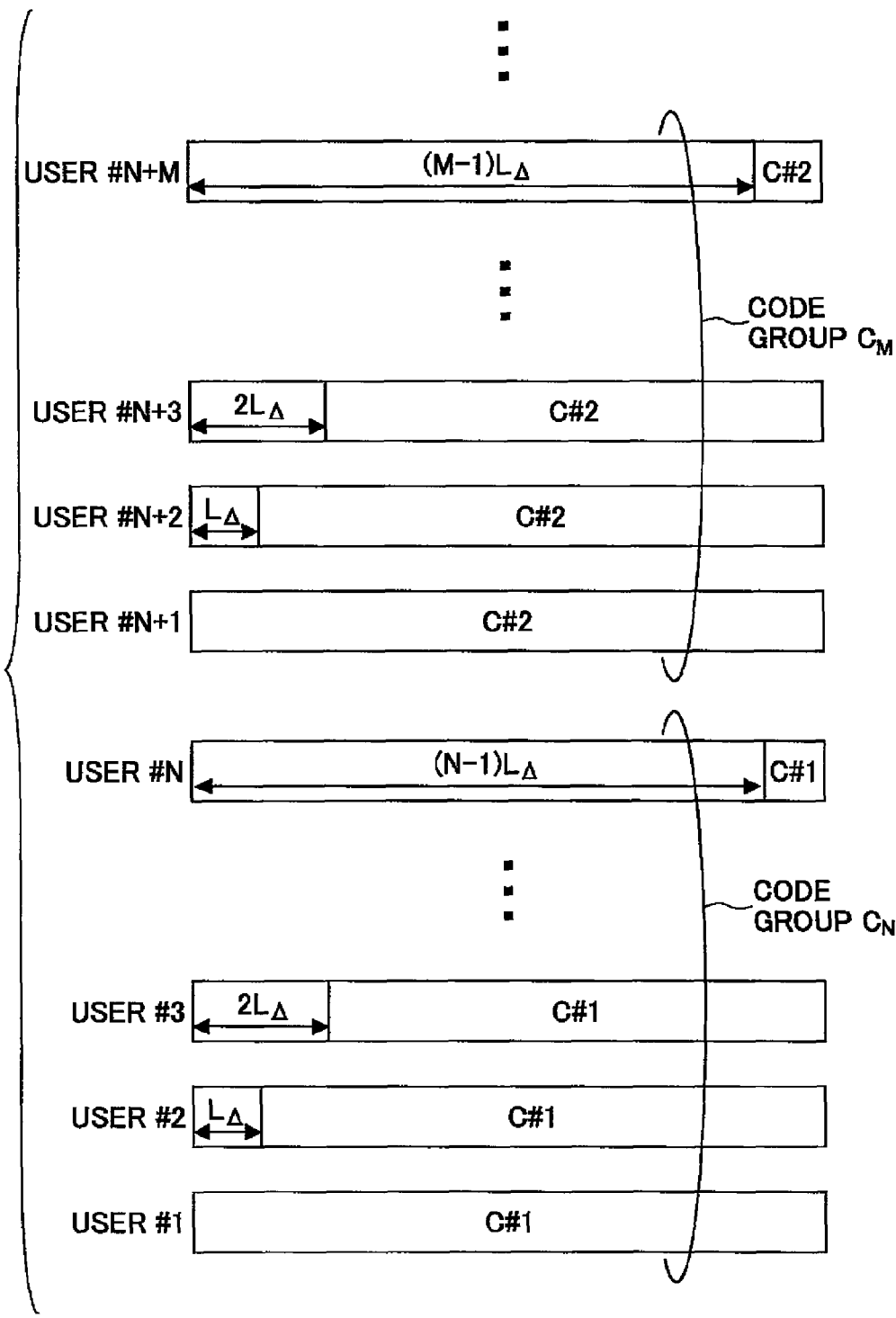
FIG. 5 is a drawing used to describe a method of assigning CAZAC codes to mobile stations using the same frequency band.

Meanwhile, uplink pilot channels of mobile stations using the same frequency band are distinguished based on the orthogonality of CAZAC codes. FIG. 5 shows (groups of) CAZAC codes used to distinguish mobile stations using the same frequency band. As described above, a base CAZAC code and a CAZAC code generated by cyclically shifting the base CAZAC code are orthogonal to each other. In this embodiment, the amount of delay $L_A$ is set at a proper value, and a group of codes generated by cyclically shifting a base CAZAC code by integral multiples of $L_A$ are used for pilot channels. For example, a code group $C_N$ including N CAZAC codes orthogonal to each other is obtained by cyclically shifting CAZAC code C#1 by integral multiples of $L_A$. As shown in FIG. 5, codes in the code group $C_N$ are assigned to users #1, #2, and so forth in the order mentioned. With this approach, N users can be distinguished. If there is an N+1th user, another code group $C_M$ including M orthogonal codes is obtained based on CAZAC code C#2 different from CAZAC code C#1, and the codes in the code group $C_M$ are assigned to N+1th and later users. Thus, it is possible to assign CAZAC codes to N+M users and thereby to distinguish the users. In this manner, CAZAC codes can be assigned to many users. Meanwhile, there is no orthogonal relationship between the code group $C_N$ and the code group $C_M$, and therefore a small amount of intersymbol interference is caused between them. Still, because the orthogonality between N codes in the code group $C_N$ is completely maintained and the orthogonality between M codes in the code group $C_M$ is completely maintained, the degree of intersymbol interference in this embodiment is far less than the intersymbol interference that occurs when codes other than CAZAC codes are used for pilot channels. Although the same shift amount $L_A$ is used for the code groups $C_N$ and $C_M$ in the above descriptions, different shift amounts may be used for the respective groups. However, using the same shift amount makes it possible to generate the same number of codes from each base CAZAC code because the code length of pilot channels is the same, and therefore may make it easier to manage codes.

Figure 6:
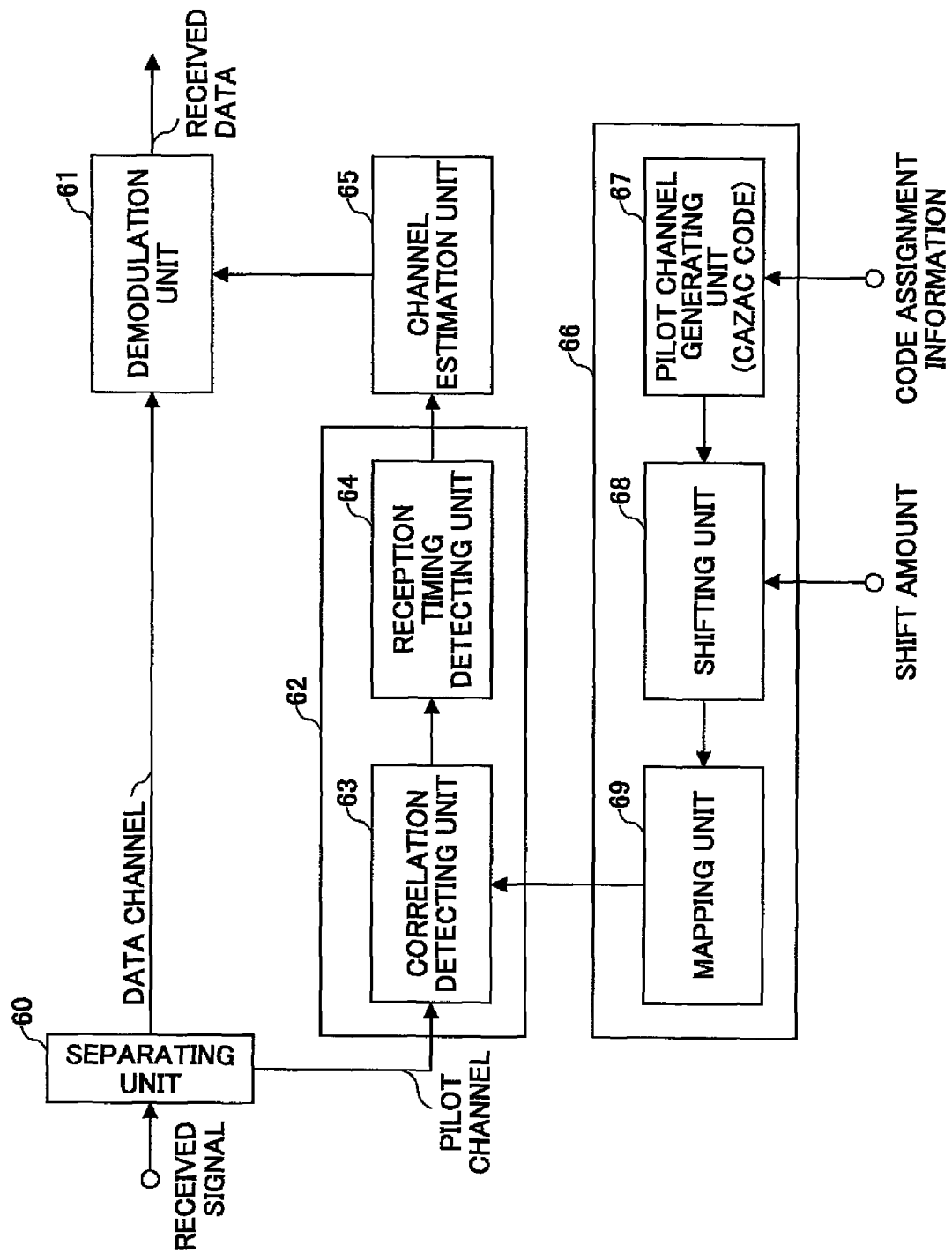
FIG. 6 is a partial block diagram illustrating a base station according to an embodiment of the present invention.

FIG. 6 is a partial block diagram of a base station according to an embodiment of the present invention. FIG. 6 shows components necessary to perform a process for one mobile station. In an actual configuration, sets of the components are provided for a number of concurrent mobile stations. The base station shown in FIG. 6 includes a separating unit 60, a demodulation unit 61, a path searcher 62 (including correlation detecting unit 63 and a reception timing detecting unit 64), a channel estimation unit 65, and a pilot replica generating unit 66 (including a pilot channel generating unit 67, a shifting unit 68, and a mapping unit 69).

The separating unit 60 separates a pilot channel and a data channel in a received signal sent from the mobile station.

The demodulation unit 61 demodulates the data channel based on the result of channel estimation.

The path searcher 62 performs a path search using the pilot channel.

The correlation detecting unit 63 calculates the correlation between a pilot channel replica and the received pilot channel and outputs the correlation calculation result.

The reception timing detecting unit 64 detects a reception timing by analyzing the timing and size of a peak indicated by the correlation calculation result.

The channel estimation unit 65 performs channel estimation based on the result of the path search.

The pilot replica generating unit 66 generates a pilot channel replica. The pilot channel generating unit 67, the shifting unit 68, and the mapping unit 69 of the pilot channel replica generating unit 66 have functions similar to those of the corresponding components 21, 22, and 23 of the mobile station.

The pilot channel generating unit 67 generates a pilot channel comprising a CAZAC code based on code assignment information.

The shifting unit 68 cyclically shifts the CAZAC code by a shift amount set for the corresponding mobile station a signal of which is to be processed.

The mapping unit 69 maps the pilot channel comprising the CAZAC code to a signal including multiple frequency components arranged at regular intervals in a frequency band currently being used by the mobile station.

In this embodiment, as described above, uplink channels (pilot channels) of mobile stations using different frequency bands are distinguished by the base station by using distributed FDMA as shown in FIG. 4. Meanwhile, uplink pilot channels of mobile stations using the same frequency band are distinguished by the based station based on the orthogonality of CAZAC codes.

A base CAZAC code and a CAZAC code generated by cyclically shifting the base CAZAC code are orthogonal to each other. This indicates that a group of delay paths of a pilot channel comprising a CAZAC code are also orthogonal to each other. That is, a delay path delayed by τ from the first path of a pilot channel corresponds to a pilot channel generated by cyclically shifting the pilot channel of the first path by τ. Thus, using CAZAC codes generated by cyclically shifting a base CAZAC code as in this embodiment makes it possible to achieve orthogonality between mobile stations and also to maintain the orthogonality between delay paths of a pilot channel from each mobile station. This in turn makes it possible to reduce intersymbol interference observed at the base station to a very low level.

<Second Embodiment>

According to a second embodiment of the present invention, although CAZAC codes are used for pilot channels of multiple mobile stations using the same frequency band, the CAZAC codes are not generated by cyclically shifting a base CAZAC code, but are generated independently for the respective mobile stations.

FIG. 7 shows CAZAC codes used in this embodiment to distinguish mobile stations using the same frequency band. In FIG. 7, CAZAC code #1 and CAZAC code are not generated by cyclic shift and are not orthogonal to each other. In this case, the intersymbol interference between mobile stations may become as large as the intersymbol interference that occurs when codes other than CAZAC codes, such as random sequences, are used. However, since CAZAC codes are used for pilot channels, the orthogonality between delay paths of each pilot channel is maintained as in the first embodiment. Therefore, compared with a case where codes other than CAZAC codes are used, this embodiment makes it possible to dramatically reduce the interference between delay paths and makes it possible to reduce the total intersymbol interference observed at the base station at least by the reduction of the interference between delay paths. Also, the second embodiment can be applied to a conventional system more easily than the first embodiment because there is no need to control the shift amount of CAZAC codes.

<Third Embodiment>

In the first embodiment, mobile stations using the same frequency band are distinguished based solely on CDMA with CAZAC codes. In a third embodiment, both distributed FDMA and CDMA with CAZAC codes are used. In this embodiment, distributed FDMA is first used to distinguish mobile stations. When there are a large number of mobile stations and it is not possible to distinguish mobile stations only by distributed FDMA, the mobile stations are distinguished by CDMA with CAZAC codes (either by the method of the first embodiment or the method of the second embodiment). With distributed FDMA, signals mapped to frequency components become completely orthogonal to each other. Therefore, distributed FDMA is preferable in terms of reducing interference. The interval between frequency components (in the comb-like frequency spectrum) used in distributed FDMA can be adjusted to some extent. For example, in FIG. 4, eight frequency components are arranged at regular intervals in the 5 MHz band. The interval may be doubled such that four frequency components are arranged in the 5 MHz band.

In this case, as shown in FIG. 8, it is possible to map a pilot channel of another mobile station using the 5 MHz band to the remaining four frequency components. FIG. 8 shows mapping of pilot channels where two users are multiplexed in the 5 MHz band by doubling the interval between comb-like frequency components. Thus, by adjusting the interval between frequency components, it is possible to increase the number of pilot channels of mobile stations using the same frequency band that can be distinguished using distributed FDMA. However, the number of pilot channels distinguishable by this approach is limited. Therefore, if the number of mobile stations is larger than the limit, the CDMA schemes described in the first and second embodiments are used to distinguish the pilot channels of the mobile stations.

The present invention is not limited to the specifically disclosed embodiments, and variations and modifications may be made without departing from the scope of the present invention. Although the present invention is described above in different embodiments, the distinctions between the embodiments are not essential for the present invention, and the embodiments may be used individually or in combination.

The present international application claims priority from Japanese Patent Application No. 2006-9302 filed on Jan. 17, 2006, the entire contents of which are hereby incorporated herein by reference.

The invention claimed is:

1. A mobile station, comprising:
a generating unit configured to generate a pilot channel comprising a CAZAC code cyclically shifted by a predetermined length;
a mapping unit configured to map the pilot channel generated by the generating unit to multiple frequency components arranged at regular intervals in a given frequency band; and
a transmitting unit configured to transmit a transmission signal including the pilot channel mapped by the mapping unit, wherein
when a first frequency band used for the pilot channel included in the transmission signal to be transmitted by the transmitting unit is the same as a second frequency band used for a pilot channel included in a transmission signal of another mobile station, the generating unit uses, for the pilot channel included in the transmission signal to be transmitted by the transmitting unit, a same code length as and a different shift amount from those used for the pilot channel included in the transmission signal of the other mobile station; and
when the first frequency band used for the pilot channel included in the transmission signal to be transmitted by the transmitting unit overlaps the second frequency band used for the pilot channel included in the transmission signal of the other mobile station and the first frequency band and the second frequency band have different bandwidths, the mapping unit maps the pilot channel to the multiple frequency components such that the pilot channel included in the transmission signal to be transmitted by the transmitting unit and the pilot channel included in the transmission signal of the other mobile station become orthogonal to each other on a frequency axis.

2. The mobile station as claimed in claim 1, wherein the generating unit is configured to attach a predetermined length of an end portion of the CAZAC code used for the pilot channel to a head of the CAZAC code.

3. The mobile station as claimed in claim 1, wherein the generating unit is configured to attach a predetermined length of a head portion of the CAZAC code used for the pilot channel to an end of the CAZAC code.

4. The mobile station as claimed in claim 1, further comprising:
a spreading unit configured to code-spread a data channel, wherein
the mapping unit is configured to map the data channel code-spread by the spreading unit to multiple frequency components arranged at regular intervals in a given frequency band; and
the transmitting unit is configured to transmit the transmission signal also including the data channel mapped by the mapping unit.

5. The mobile station as claimed in claim 2, further comprising:
a spreading unit configured to code-spread a data channel, wherein
the mapping unit is configured to map the data channel code-spread by the spreading unit to multiple frequency components arranged at regular intervals in a given frequency band; and
the transmitting unit is configured to transmit the transmission signal also including the data channel mapped by the mapping unit.

6. The mobile station as claimed in claim 3, further comprising:
a spreading unit configured to code-spread a data channel, wherein
the mapping unit is configured to map the data channel code-spread by the spreading unit to multiple frequency components arranged at regular intervals in a given frequency band; and
the transmitting unit is configured to transmit the transmission signal also including the data channel mapped by the mapping unit.

7. A mobile station, comprising:
a generating unit configured to generate a pilot channel comprising a CAZAC code cyclically shifted by a predetermined length;
a mapping unit configured to map the pilot channel generated by the generating unit to multiple frequency components arranged at regular intervals in a given frequency band; and
a transmitting unit configured to transmit a transmission signal including the pilot channel mapped by the mapping unit, wherein
when a first frequency band used for the pilot channel included in the transmission signal to be transmitted by the transmitting unit overlaps a second frequency band used for a pilot channel included in a transmission signal of another mobile station and the first frequency band and the second frequency band have different bandwidths, the mapping unit maps the pilot channel to the multiple frequency components such that the pilot channel included in the transmission signal to be transmitted by the transmitting unit and the pilot channel included in the transmission signal of the other mobile station become orthogonal to each other on a frequency axis.

8. The mobile station as claimed in claim 7, wherein the generating unit is configured to attach a predetermined length of an end portion of the CAZAC code used for the pilot channel to a head of the CAZAC code.

9. The mobile station as claimed in claim 7, wherein the generating unit is configured to attach a predetermined length of a head portion of the CAZAC code used for the pilot channel to an end of the CAZAC code.

10. The mobile station as claimed in claim 7, further comprising:
a spreading unit configured to code-spread a data channel, wherein
the mapping unit is configured to map the data channel code-spread by the spreading unit to multiple frequency components arranged at regular intervals in a given frequency band; and
the transmitting unit is configured to transmit the transmission signal also including the data channel mapped by the mapping unit.

11. The mobile station as claimed in claim 8, further comprising:
a spreading unit configured to code-spread a data channel, wherein
the mapping unit is configured to map the data channel code-spread by the spreading unit to multiple frequency components arranged at regular intervals in a given frequency band; and
the transmitting unit is configured to transmit the transmission signal also including the data channel mapped by the mapping unit.

12. The mobile station as claimed in claim 9, further comprising:
a spreading unit configured to code-spread a data channel, wherein
the mapping unit is configured to map the data channel code-spread by the spreading unit to multiple frequency components arranged at regular intervals in a given frequency band; and
the transmitting unit is configured to transmit the transmission signal also including the data channel mapped by the mapping unit.

13. A transmission method performed by a mobile station, comprising the steps of:
generating a pilot channel comprising a CAZAC code cyclically shifted by a predetermined length;
mapping the generated pilot channel to multiple frequency components arranged at regular intervals in a given frequency band; and
transmitting a transmission signal including the mapped pilot channel,
wherein
in the generating step, when a first frequency band used for the pilot channel included in the transmission signal to be transmitted in the transmitting step is the same as a second frequency band used for a pilot channel included in a transmission signal of another mobile station, a same code length as and a different shift amount from those used for the pilot channel included in the transmission signal of the other mobile station are used for the pilot channel included in the transmission signal to be transmitted in the transmitting step; and
in the mapping step, when the first frequency band used for the pilot channel included in the transmission signal to be transmitted in the transmitting step overlaps the second frequency band used for the pilot channel included in the transmission signal of the other mobile station and the first frequency band and the second frequency band have different bandwidths, the pilot channel is mapped to the multiple frequency components such that the pilot channel included in the transmission signal to be transmitted in the transmitting step and the pilot channel included in the transmission signal of the other mobile station become orthogonal to each other on a frequency axis.

14. The transmission method as claimed in claim 13, wherein in the generating step, a predetermined length of an end portion of the CAZAC code used for the pilot channel is attached to a head of the CAZAC code.

15. The transmission method as claimed in claim 13, wherein in the generating step, a predetermined length of a head portion of the CAZAC code used for the pilot channel is attached to an end of the CAZAC code.

16. The transmission method as claimed in claim 13, further comprising the step of:
code-spreading a data channel, wherein
in the mapping step, the data channel code-spread in the code-spreading step is mapped to multiple frequency components arranged at regular intervals in a given frequency band; and
in the transmitting step, the transmission signal also including the data channel mapped in the mapping step is transmitted.

17. The transmission method as claimed in claim 14, further comprising the step of:
code-spreading a data channel, wherein
in the mapping step, the data channel code-spread in the code-spreading step is mapped to multiple frequency components arranged at regular intervals in a given frequency band; and
in the transmitting step, the transmission signal also including the data channel mapped in the mapping step is transmitted.

18. The transmission method as claimed in claim 15, further comprising the step of:
code-spreading a data channel, wherein
in the mapping step, the data channel code-spread in the code-spreading step is mapped to multiple frequency components arranged at regular intervals in a given frequency band; and
in the transmitting step, the transmission signal also including the data channel mapped in the mapping step is transmitted.

19. A transmission method performed by a mobile station, comprising the steps of:
generating a pilot channel comprising a CAZAC code cyclically shifted by a predetermined length;
mapping the generated pilot channel to multiple frequency components arranged at regular intervals in a given frequency band; and
transmitting a transmission signal including the mapped pilot channel,
wherein
in the mapping step, when a first frequency band used for the pilot channel included in the transmission signal to be transmitted in the transmitting step overlaps a second frequency band used for a pilot channel included in a transmission signal of another mobile station and the first frequency band and the second frequency band have different bandwidths, the pilot channel is mapped to the multiple frequency components such that the pilot channel included in the transmission signal to be transmitted in the transmitting step and the pilot channel included in the transmission signal of the other mobile station become orthogonal to each other on a frequency axis.

20. The transmission method as claimed in claim 19, wherein in the generating step, a predetermined length of an end portion of the CAZAC code used for the pilot channel is attached to a head of the CAZAC code.

21. The transmission method as claimed in claim 19, wherein in the generating step, a predetermined length of a head portion of the CAZAC code used for the pilot channel is attached to an end of the CAZAC code.

22. The transmission method as claimed in claim 19, further comprising the step of:
code-spreading a data channel, wherein
in the mapping step, the data channel code-spread in the code-spreading step is mapped to multiple frequency components arranged at regular intervals in a given frequency band; and
in the transmitting step, the transmission signal also including the data channel mapped in the mapping step is transmitted.

23. The transmission method as claimed in claim 20, further comprising the step of:
code-spreading a data channel, wherein
in the mapping step, the data channel code-spread in the code-spreading step is mapped to multiple frequency components arranged at regular intervals in a given frequency band; and
in the transmitting step, the transmission signal also including the data channel mapped in the mapping step is transmitted.

24. The transmission method as claimed in claim 21, further comprising the step of:
code-spreading a data channel, wherein
in the mapping step, the data channel code-spread in the code-spreading step is mapped to multiple frequency components arranged at regular intervals in a given frequency band; and
in the transmitting step, the transmission signal also including the data channel mapped in the mapping step is transmitted.

25. A communication system, comprising:
a mobile station configured to map a pilot channel comprising a CAZAC code cyclically shifted by a predetermined length to multiple frequency components arranged at regular intervals in a given frequency band and to transmit a transmission signal including the mapped pilot channel; and
a base station configured to receive the transmission signal from the mobile station, wherein
when a first frequency band used for the pilot channel included in the transmission signal to be transmitted from the mobile station is the same as a second frequency band used for a pilot channel included in a transmission signal of another mobile station, the mobile station uses, for the pilot channel included in the transmission signal to be transmitted from the mobile station, a same code length as and a different shift amount from those used for the pilot channel included in the transmission signal of the other mobile station; and
when the first frequency band used for the pilot channel included in the transmission signal to be transmitted from the mobile station overlaps the second frequency band used for the pilot channel included in the transmission signal of the other mobile station and the first frequency band and the second frequency band have different bandwidths, the mobile station maps the pilot channel to the multiple frequency components such that the pilot channel included in the transmission signal to be transmitted from the mobile station and the pilot channel included in the transmission signal of the other mobile station become orthogonal to each other on a frequency axis.

26. A communication system, comprising:
a mobile station configured to map a pilot channel comprising a CAZAC code cyclically shifted by a predetermined length to multiple frequency components arranged at regular intervals in a given frequency band and to transmit a transmission signal including the mapped pilot channel; and a base station configured to receive the transmission signal from the mobile station, wherein when a first frequency band used for the pilot channel included in the transmission signal to be transmitted from the mobile station overlaps a second frequency band used for a pilot channel included in a transmission signal of another mobile station and the first frequency band and the second frequency band have different bandwidths, the mobile station maps the pilot channel to the multiple frequency components such that the pilot channel included in the transmission signal to be transmitted from the mobile station and the pilot channel included in the transmission signal of the other mobile station become orthogonal to each other on a frequency axis.

27. A base station, comprising:

a receiving unit configured to receive, from a mobile station, a transmission signal including a pilot channel comprising a CAZAC code cyclically shifted by a predetermined length, the pilot channel being mapped to multiple frequency components arranged at regular intervals in a given frequency band; and a processing unit configured to process the received transmission signal, wherein when a first frequency band used for the pilot channel included in the received transmission signal is the same as a second frequency band used for a pilot channel included in a transmission signal of another mobile station, a same code length as and a different shift amount from those used for the pilot channel included in the transmission signal of the other mobile station are used for the pilot channel included in the received transmission signal, and when the first frequency band used for the pilot channel included in the received transmission signal overlaps the second frequency band used for the pilot channel included in the transmission signal of the other mobile station and the first frequency band and the second frequency band have different bandwidths, the pilot channel included in the received transmission signal is mapped to the multiple frequency components such that the pilot channel included in the received transmission signal and the pilot channel included in the transmission signal, of the other mobile station become orthogonal to each other on a frequency axis.

28. A base station, comprising:

a receiving unit configured to receive, from a mobile station, a transmission signal including a pilot channel comprising a CAZAC code cyclically shifted by a predetermined length, the pilot channel being mapped to multiple frequency components arranged at regular intervals in a given frequency band; and a processing unit configured to process the received transmission signal, wherein when a first frequency band used for the pilot channel included in the received transmission signal overlaps a second frequency band used for a pilot channel included in a transmission signal of another mobile station and the first frequency band and the second frequency band have different bandwidths, the pilot channel included in the received transmission signal is mapped to the multiple frequency components such that the pilot channel included in the received transmission signal and the pilot channel included in the transmission signal of the other mobile station become orthogonal to each other on a frequency axis.

29. The base station as claimed in claim 27, wherein in the pilot channel included in the received transmission signal, a predetermined length of an end portion of the CAZAC code used for the pilot channel is attached to a head of the CAZAC code.

30. The base station as claimed in claim 28, wherein in the pilot channel included in the received transmission signal, a predetermined length of an end portion of the CAZAC code used for the pilot channel is attached to a head of the CAZAC code.

31. The base station as claimed in claim 27, wherein in the pilot channel included in the received transmission signal, a predetermined length of a head portion of the CAZAC code used for the pilot channel is attached to an end of the CAZAC code.

32. The base station as claimed in claim 28, wherein in the pilot channel included in the received transmission signal, a predetermined length of a head portion of the CAZAC code used for the pilot channel is attached to an end of the CAZAC code.

33. The base station as claimed in claim 27, the received transmission signal further includes a data channel that is code-spread and mapped to multiple frequency components arranged at regular intervals in a given frequency band.

34. The base station as claimed in claim 28, the received transmission signal further includes a data channel that is code-spread and mapped to multiple frequency components arranged at regular intervals in a given frequency band.

35. A reception method performed by a base station, the method comprising:

receiving, from a mobile station, a transmission signal including a pilot channel comprising a CAZAC code cyclically shifted by a predetermined length, the pilot channel being mapped to multiple frequency components arranged at regular intervals in a given frequency band; and processing the received transmission signal, wherein when a first frequency band used for the pilot channel included in the received transmission signal is the same as a second frequency band used for a pilot channel included in a transmission signal of another mobile station, a same code length as and a different shift amount from those used for the pilot channel included in the transmission signal of the other mobile station are used for the pilot channel included in the received transmission signal, and when the first frequency band used for the pilot channel included in the received transmission signal overlaps the second frequency band used for the pilot channel included in the transmission signal of the other mobile station and the first frequency band and the second frequency band have different bandwidths, the pilot channel included in the received transmission signal is mapped to the multiple frequency components such that the pilot channel included in the received transmission signal and the pilot channel included in the transmission signal of the other mobile station become orthogonal to each other on a frequency axis.

36. A reception method performed by a base station, the method comprising:

receiving, from a mobile station, a transmission signal including a pilot channel comprising a CAZAC code cyclically shifted by a predetermined length, the pilot channel being mapped to multiple frequency components arranged at regular intervals in a given frequency band; and processing the received transmission signal, wherein when a first frequency band used for the pilot channel included in the received transmission signal overlaps a second frequency band used for a pilot channel included in a transmission signal of another mobile station and the first frequency band and the second frequency band have different bandwidths, the pilot channel included in the received transmission signal is mapped to the multiple frequency components such that the pilot channel included in the received transmission signal and the pilot channel included in the transmission signal of the other mobile station become orthogonal to each other on a frequency axis.

37. The reception method as claimed in claim 35, wherein in the pilot channel included in the received transmission signal, a predetermined length of an end portion of the CAZAC code used for the pilot channel is attached to a head of the CAZAC code.

38. The reception method as claimed in claim 36, wherein in the pilot channel included in the received transmission signal, a predetermined length of an end portion of the CAZAC code used for the pilot channel is attached to a head of the CAZAC code.

39. The reception method as claimed in claim 35, wherein in the pilot channel included in the received transmission signal, a predetermined length of a head portion of the CAZAC code used for the pilot channel is attached to an end of the CAZAC code.

40. The reception method as claimed in claim 36, wherein in the pilot channel included in the received transmission signal, a predetermined length of a head portion of the CAZAC code used for the pilot channel is attached to an end of the CAZAC code.

41. The reception method as claimed in claim 35, the received transmission signal further includes a data channel that is code-spread and mapped to multiple frequency components arranged at regular intervals in a given frequency band.

42. The reception method as claimed in claim 36, the received transmission signal further includes a data channel that is code-spread and mapped to multiple frequency components arranged at regular intervals in a given frequency band.

* * * * *